(12) United States Patent
Morimoto et al.

(10) Patent No.: US 9,789,850 B2
(45) Date of Patent: Oct. 17, 2017

(54) DISCONNECTION DETECTION DEVICE

(71) Applicant: YAZAKI CORPORATION, Tokyo (JP)

(72) Inventors: Mitsuaki Morimoto, Shizuoka (JP); Gosei Sato, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/204,592

(22) Filed: Jul. 7, 2016

(65) Prior Publication Data
US 2016/0318477 A1 Nov. 3, 2016

Related U.S. Application Data

(63) Continuation of application No. PCT/JP2015/050556, filed on Jan. 9, 2015.

(30) Foreign Application Priority Data

Jan. 10, 2014 (JP) ................................ 2014-002826

(51) Int. Cl.
*B60R 25/10* (2013.01)
*B60R 25/34* (2013.01)
(Continued)

(52) U.S. Cl.
CPC ............ *B60R 25/1004* (2013.01); *B60C 5/00* (2013.01); *B60R 25/104* (2013.01); *B60R 25/24* (2013.01);
(Continued)

(58) Field of Classification Search
CPC ... B60R 21/16; B60R 25/1004; B60R 25/104; B60R 25/34; B60R 2025/1013; B60C 5/00; B60Q 11/00; G08B 21/00
(Continued)

(56) References Cited

U.S. PATENT DOCUMENTS 4,835,514 A * 5/1989 Masegi ............... B60R 25/1018
180/287
5,463,258 A * 10/1995 Filion .................... B60Q 5/003
200/61.54
(Continued)

FOREIGN PATENT DOCUMENTS

CN          1037306 A     11/1989
CN          2332617 Y      8/1999
(Continued)

OTHER PUBLICATIONS

International Search Report and Written Opinion of the International Search Report for PCT/JP2015/050556 dated Feb. 3, 2015.
(Continued)

*Primary Examiner* — Hoi Lau
(74) *Attorney, Agent, or Firm* — Kenealy Vaidya LLP (57) ABSTRACT

A disconnection detection device for an in-vehicle device having a load circuit, is provided with a second wire harness which is arranged along at least a part of the first wire harness, a current circuit which supplies a current for disconnection detection to the second wire harness, and a disconnection determination circuit which monitors an output voltage of the current circuit so as to determine presence or absence of disconnection of the second wire harness. Disconnection of the second wire harness is detected as the disconnection of the first wire harness based on disconnection determination of the disconnection determination circuit.

6 Claims, 6 Drawing Sheets (51) Int. Cl.
*B60R 25/104* (2013.01)
*B60C 5/00* (2006.01)
*G08B 13/14* (2006.01)
*B60R 25/24* (2013.01)
*G08B 29/06* (2006.01)
*B60R 25/40* (2013.01)

(52) U.S. Cl.
CPC ............. *B60R 25/34* (2013.01); *B60R 25/40* (2013.01); *G08B 13/14* (2013.01); *G08B 29/06* (2013.01); *B60R 2025/1013* (2013.01)

(58) Field of Classification Search
USPC ......... 340/426.23, 426.24, 425.5, 426.1, 428
See application file for complete search history.

(56) References Cited

U.S. PATENT DOCUMENTS

| | | | | |
|---|---|---|---|---|
| 5,623,245 | A * | 4/1997 | Gilmore | B60R 25/04 307/10.2 |
| 5,965,952 | A * | 10/1999 | Podoloff | B60Q 5/003 280/728.3 |
| 2006/0191730 | A1* | 8/2006 | Alden | B60K 28/06 180/272 |
| 2007/0080525 | A1* | 4/2007 | Mauriello | G07C 5/085 280/731 |
| 2007/0096893 | A1* | 5/2007 | Kondo | B62J 6/001 340/471 |
| 2007/0257783 | A1* | 11/2007 | Matsumoto | B60K 6/445 340/425.5 |
| 2008/0291034 | A1* | 11/2008 | Kernwein | B60Q 5/00 340/626 |
| 2013/0249680 | A1* | 9/2013 | Goto | B60Q 5/008 340/425.5 |
| 2016/0318477 | A1* | 11/2016 | Morimoto | B60R 25/40 |
| 2016/0318478 | A1* | 11/2016 | Morimoto | B60R 25/34 |
| 2016/0355179 | A1* | 12/2016 | Cannella | B60T 7/22 |

FOREIGN PATENT DOCUMENTS

| | | |
|---|---|---|
| CN | 1353060 A | 6/2002 |
| CN | 202783096 U | 3/2013 |
| JP | 60-96155 U | 7/1985 |
| JP | 8-26073 A | 1/1996 |
| JP | 2000-155874 A | 6/2000 |
| JP | 2009-184368 A | 8/2009 |
| JP | 2009-280001 A | 12/2009 |

OTHER PUBLICATIONS

Chinese Office Action for the related Chinese Patent Application No. 201580004284.4 dated Mar. 31, 2017.
English language Written Opinion of the International Search Report for PCT/JP2015/050556 dated Feb. 3, 2015.

* cited by examiner

DISCONNECTION DETECTION DEVICE

CROSS REFERENCE TO RELATED APPLICATIONS

This application claims priority from Japanese Patent Application No. 2014-002826 filed on Jan. 10, 2014, the entire contents of which are incorporated herein by reference.

BACKGROUND OF THE INVENTION

Field of the Invention

The present invention relates to a disconnection detection device, and in particular, to a disconnection detection device which detects disconnection (cut) of a wire harness connected to a low-resistance load circuits, such as an actuator or a horn.

Description of Related Art

An antitheft device for a vehicle has a detection sensor which detects abnormality relating to a theft of a vehicle, a sound generation device (siren) which generates alarm sound in order to make surrounding people recognize offenses and to issue a warning (including a threat) to a thief, and a main unit which determines presence or absence of a theft based on a detection signal from the detection sensor and controls the output of alarm sound. In regard to the antitheft device configured as above, in many vehicles, a horn device which is mounted as a standard feature in the vehicle and outputs horn sound or a separated horn (so-called security horn) is used as a siren (sound generation device).

A horn provided in the horn device is attached in an engine room or a vehicle front portion, such as a bumper attachment portion. For this reason, the thief inserts a tool or the like from a gap of a hood or a front grill, or a gap formed by prying or the like, whereby there is a problem in that the horn is destroyed. As a method of solving such a problem, a sound generation device for theft alarm and an antitheft control system described in Patent Literature 1: JP-A-2009-280001 are known. In the technique described in Patent Literature 1, a shield portion which resonates by the frequency of alarm sound generated from the horn is provided between the outside of the vehicle and the horn (siren for theft alarm), and the shield portion protects the horn. In addition, since the shield portion resonates at the frequency of alarm sound by alarm sound from the horn, the sound volume is prevented from being reduced due to alarm sound being shielded by the shield portion.
[Patent Literature 1] JP-A-2009-280001

However, in the invention described in Patent Literature 1, since it is necessary to provide the shield portion which is not directly related to the original function of the horn, there is a problem in that the weight or cost of the horn is increased. In addition, in order to prevent alarm sound (horn sound and howling sound) from the horn from being completely shielded, it is necessary to provide a gap between the horn and the shield portion, and there is a problem in that the attachment space of the horn is increased.

A general horn device has a horn which outputs horn sound, a horn button which is disposed in a steering wheel, a relay which has a contact circuit being opened or closed in conjunction with the on/off state of the horn button and controls the on/off state of supply of drive power to the horn, and a wire harness which electrically connects the relay and the horn.

In particular, the horn (including the security horn) is attached in the engine room or the vehicle front portion, such as the bumper attachment portion. For this reason, the thief inserts a tool or the like from the gap of the hood or the front grill, or the gap formed by prying or the like, whereby there is a problem in that the wire harness which supplies drive power to the horn is cut. Since drive power is not supplied to the horn due to the cut of the wire harness, there is a problem in that the effect of the antitheft device is substantially invalidated. Even in the configuration described in Patent Literature 1, since a main unit and the security horn are connected to each other by the wire harness, there is a concern that the same problem as in a case where a horn device is used as a sound generation device of an antitheft device occurs.

In a general vehicle, door locking and unlocking can be performed by a remote operation of an electronic key or a door lock switch in the vehicle as well as locking and unlocking a door using a key (engine key). In a vehicle in which door locking and unlocking can be performed by such a remote operation, a door lock motor (actuator for door lock) is mounted in each door, and drive power (drive signal) is supplied to each door lock motor from a controller through a wire harness. However, in the door lock mechanism configured as above, there is a concern that a thief cuts the wire harness in a transition portion of the door and supplies drive power from the cut wire harness on the door side to the door lock motor to actuate the door lock motor, thereby unlocking the door.

SUMMARY

One or more embodiments provide a disconnection detection device capable of improving disconnection detection performance of a wire harness transmitting drive power from a load drive circuit to a load circuit and improving antitheft performance.

In an aspect (1), one or more embodiments provide a disconnection detection device for an in-vehicle device having a load circuit, a load drive circuit which controls supply of drive power for driving the load circuit, and a first wire harness which has one end connected to the load drive circuit and the other end connected to the load circuit and supplies the drive power from the load drive circuit to the load circuit. The disconnection detection device detects disconnection of the first wire harness. The disconnection detection device includes a second wire harness which is arranged along at least a part of the first wire harness, a current circuit which supplies a current for disconnection detection to the second wire harness, and a disconnection determination circuit which monitors an output voltage of the current circuit so as to determine presence or absence of disconnection of the second wire harness. Disconnection of the second wire harness is detected as the disconnection of the first wire harness based on disconnection determination of the disconnection determination circuit.

In an aspect (2), the load circuit includes at least two horns which output horn sound. The load drive circuit includes a drive switch which supplies the drive power to the two horns. The disconnection determination circuit monitors the output voltage of the current circuit so as to determine the presence or absence of disconnection of the second wire harness, and turns on the drive switch so as to allow the drive power to be supplied to the first wire harness in a case where disconnection of the second wire harness is detected. The drive power is supplied to the horn connected to the first wire harness on a non-disconnection side of at least the two horns to output horn sound from the horn.

In an aspect (3), the first wire harness is branched at a branch point and connected to each of the two horns. The two horns are connected in parallel to the drive switch. The second wire harness is arranged along the first wire harness from the drive switch side farther than the branch, passes through the branch point, reaches one horn of the two horns, is folded without being connected to the one horn, is arranged to the branch point, and is arranged so as to reach the other horn of the two horns.

In an aspect (4), the second wire harness includes one wire harness which has one end connected to the current circuit and the disconnection determination circuit, and the other end reaching the other horn through the one horn.

In an aspect (5), the other end of the second wire harness is connected to the first wire harness at a connection position of the other horn and the first wire harness, or connected to the ground in the vicinity of the other horn. A reference voltage for the disconnection determination circuit to determine disconnection of the second wire harness is set to a voltage level between a power supply voltage of the current circuit and the voltage of the ground.

In an aspect (6), the drive switch includes a horn switch and a relay. The horn switch is turned on/off corresponding to an operation of a horn button. In the relay, one side of a contact circuit is connected to a power supply, the other side of the contact circuit is connected to the first wire harness, and the contact circuit is turned on/off corresponding to the on/off state of the horn switch.

In an aspect (7), the disconnection detection device further includes a supply control circuit which alternately performs the supply and stop of the current for disconnection detection supplied from the current circuit.

According to one or more embodiments, the second wire harness is disposed along the first wire harness, the current for disconnection detection flows from the current circuit to the second wire harness to monitor disconnection (cut) of the second wire harness, and disconnection of the second wire harness is detected as disconnection (cut) of the first wire harness. Therefore, even if the internal resistance of the load circuit becomes low resistance, it is possible to extend the voltage range for disconnection detection; thus, it is possible to improve disconnection detection performance of the first wire harness, and as a result, a disconnection detection device capable of improving antitheft performance is provided.

In particular, in a case where the disconnection determination circuit detects disconnection of the second wire harness, the drive switch is turned on and drive power is supplied to the first wire harness, drive power is supplied to the horn connected to the first wire harness on a non-disconnection side, the horn on the non-disconnection side is used as an alarm device, and horn sound is output from the horn; thus, it is possible to improve antitheft performance in the horn device.

Then, the first wire harness is branched at a branch point and connected to the two horns, and in the horn device in which the two horns are connected in parallel to the drive switch, the second wire harness is arranged along the first wire harness from the drive switch side farther than the branch point, passes through the branch point, reaches the one horn of the two horns, is then folded without being connected to the one horn, is arranged to the branch point, and is then arranged so as to reach the other horn, whereby it is possible to realize the disconnection detection device with a simple circuit configuration.

The current supply control circuit which alternately performs the supply and stop of the constant current for disconnection detection supplied from the current circuit is provided, the current is output discontinuously (intermittently); thus, it is possible to significantly reduce power consumption in the disconnection detection device. At this time, a supply period and a stop period are controlled such that the supply period during which a signal for disconnection detection is supplied becomes longer than the stop period during which the signal for disconnection detection is stopped, whereby it is possible to make the output period of the current even shorter; thus, it is possible to further reduce power consumption in the disconnection detection device.

DETAILED DESCRIPTION

Hereinafter, an embodiment to which the invention is applied will be described referring to the drawings. In the following description, the same components are represented by the same reference numerals and repetitive description will be omitted.

Embodiment 1

Figure 1:
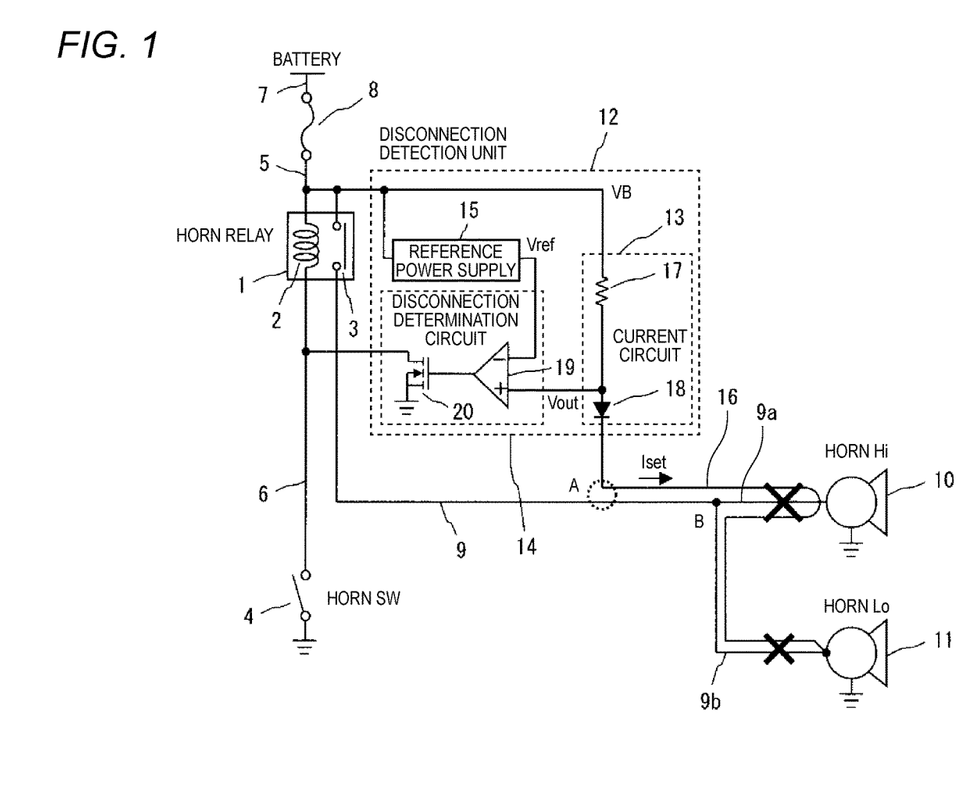
FIG. 1 is a diagram illustrating the schematic configuration of a horn device including a disconnection detection device of Embodiment 1 of the invention.

FIG. 1 is a diagram illustrating the schematic configuration of a horn device including a disconnection detection device of Embodiment 1 of the invention. Hereinafter, the disconnection detection device of Embodiment 1 and the horn device including the same will be described referring to FIG. 1. The horn device including the disconnection detection device of Embodiment 1 has the same configuration as that of a conventional horn device excluding the disconnection detection device having a disconnection detection unit 12 and a wire harness 16 for disconnection detection, and thus, in the following description, the disconnection detection device will be described in detail. In regard to the horn device shown in FIG. 1, a body ground type in which a minus terminal of a battery, that is, a ground (GND) is connected to a vehicle body (not shown) will be described. In addition, in the following description, in a case of connecting the horn device to the plus terminal of the battery, this is simply abbreviated as "connection to a power supply". When connecting the horn device to the plus terminal of the battery, even if the horn device is connected to the plus terminal of the battery through a wire harness 7 and a fuse 8, this is abbreviated as "connection to a power supply".

As shown in FIG. 1, the horn device including the disconnection detection device of Embodiment 1 has a known relay (horn relay, load drive circuit) 1, and one terminal of a coil 2 constituting the relay 1 is connected to a power supply (a plus terminal of a battery (not shown), and in the drawing, referred to as BATTERY) through a wire harness 5. The other terminal of the coil 2 is connected to a known horn switch (horn SW) 4 through a wire harness 6. With this, the on/off state of the relay 1, that is, the on/off state of a contact circuit 3 is controlled according to the on/off state of the horn switch (horn SW) 4 corresponding to an operation of a horn button disposed in a steering wheel.

In the contact circuit 3 forming the relay 1, one terminal is connected to a power supply through a wire harness 5, and the other terminal is connected to two horns (load circuit) 10 and 11 through wire harnesses (first wire harness) 9, 9a, and 9b. At this time, in the horn device of Embodiment 1, the wire harness 9 is branched into two wire harnesses 9a and 9b at a point (branch position) B shown in the drawing, the horn 10 is connected to the wire harness 9a, and the horn 11 is connected to the wire harness 9b. In the two horns 10 and 11, one horn 10 is a horn which outputs high-tone horn sound (howling sound), and the other horn 11 is a horn which outputs low-tone horn sound (howling sound). For the two horns 10 and 11, two horns which output the same horn sound (howling sound) may be used, and in addition, three or more horns may be used.

In general, the horn SW 4 is disposed in a vehicle interior, the fuse 8 or the relay 1 is disposed in a relay block provided in an engine room, and the two horns 10 and 11 and the branched wire harnesses 9a and 9b are disposed on the front side in the engine room. For this reason, the wire harnesses 9a and 9b after branched disposed in the engine room are more likely to be cut than the wire harness 9 before branched. That is, since there is a high possibility that the wire harnesses 9a and 9b are cut at positions of marks x shown in FIG. 1, it is preferable that a disconnection detection unit 12 of the invention described below is disposed at a position less vulnerable to an attack from a thief, such as the vehicle interior or the relay block in the engine room.

In addition, as described below, in the disconnection detection device of Embodiment 1, first, the cut of a wire harness (second wire harness) 16 for disconnection detection disposed along the wire harnesses 9a and 9b respectively connected to the two horns constituting the horn device is detected. Next, when disconnection is detected, it is determined that at least one wire harness of the wire harnesses 9a and 9b is cut. Next, since the horn is driven through the uncut wire harness to output horn sound based on this determination result, it is preferable that the two horns 10 and 11 are disposed to be separated from each other. In addition, it is preferable that the wire harnesses 9a and 9b connected to the respective horns are arranged to be separated from each other.

The disconnection detection device of Embodiment 1 is a disconnection detection device which has a disconnection detection unit 12 having a current circuit 13, a disconnection determination circuit 14, and a reference power supply 15, and a wire harness 16 for disconnection detection disposed along the wire harnesses 9, 9a, and 9b. At this time, in the disconnection detection unit 12 of Embodiment 1, power is input through the wire harness 5, and a power supply voltage is supplied to the current circuit 13 and the reference power supply 15 constituting the disconnection detection unit 12 in the disconnection detection unit 12.

The current circuit 13 includes a resistor (resistive element) 17 which is connected to the power supply and functions as an element for pull-up, and the resistor 17 functions as an element which limits the amount of current output to the wire harness 16 for disconnection detection. The current circuit 13 includes a diode 18 which prevents the inflow of the current into the disconnection detection unit 12 through the wire harness 16 for disconnection detection, the anode (positive electrode) of the diode 18 is connected to the resistor 17, and the cathode (negative electrode) of the diode 18 is connected to the wire harness 16 for disconnection detection. At this time, since the disconnection detection device is operated in a case where the vehicle is stopped, power consumption needs to be significantly reduced. Accordingly, in the current circuit 13 of Embodiment 1, the resistor 17 having a large resistance value is used, whereby the amount of current for disconnection detection applied to the wire harness 16 for disconnection detection is reduced. The resistor 17 has a large resistance value, whereby the horns 10 and 11 as a load are prevented from being operated by the current (current Iset) for disconnection detection supplied from the current circuit 13.

Since a voltage from the power supply is applied to the horns 10 and 11 as a load circuit when viewed from the current circuit 13 like the disconnection detection unit 12, the diode 18 may not be used, that is, the current circuit 13 may be formed only of the resistor 17. In the current circuit 13 of Embodiment 1, the voltage is applied directly from the power supply to the resistor 17; however, the invention is not limited to this configuration, and a configuration in which a different voltage is applied, for example, a configuration in which a known constant voltage source is provided and an output voltage of the constant voltage source is supplied to the resistor 17 may be made. Like a case where a voltage different from the power supply is applied, or the like, in a case where a voltage lower than the voltage applied to the horns 10 and 11 to be a load circuit is applied to the wire harness 16 for disconnection detection, or in a case where there is a problem, such as noise, the diode 18 needs to be provided.

With the above-described configuration, as described below in detail, the current circuit 13 of Embodiment 1 can control the amount of current supplied to the wire harness 16 for disconnection detection by the selection of the resistance value of the resistor 17 and can realize a desired disconnection detection function. In addition, as indicated by arrow in the drawing, the current circuit 13 supplies the current (current for disconnection detection) Iset to the wire harness 16 for disconnection detection and the current Iset flows to the ground (GND) through the horn 11 connected to the end portion of the wire harness 16 for disconnection detection. At this time, since the internal resistance of the horn 11 becomes resistance of a solenoid (coil) (not shown), that is, becomes low resistance, the current Iset has the amount of current substantially determined by the resistance value of the resistor 17, and can have a significantly small amount of current. In the configuration of Embodiment 1, since the current Iset flows to the ground (GND) through the solenoid (coil) (not shown) of the horn 11, it is possible to obtain a remarkable effect capable of detecting disconnection of the solenoid of the horn 11 and to improve reliability of the horn device. However, the configuration of the current circuit 13 is not limited to the configuration shown in FIG. 1, and for example, a different circuit configuration, such as a known constant current circuit, may be used.

The disconnection determination circuit 14 has, for example, a configuration in which a comparator 19 is formed using a known operational amplifier, and the side of the resistor 17 not connected to the power supply and the anode side of the diode 18 are connected to the non-inverting input terminal (in the drawing, "+" terminal) of the comparator 19. That is, a voltage obtained by adding a forward voltage drop of the diode 18 to the voltage of the wire harness 16 for disconnection detection is input to the non-inverting input terminal of the comparator 19. An output voltage (reference voltage) Vref of a reference power supply 15 which generates a predetermined reference voltage from the voltage input from the battery is input to the inverting input terminal (in the drawing, "−" terminal) of the comparator 19.

In addition, the gate terminal of an n-type MOS transistor 20 is connected to the output terminal of the comparator 19. At this time, the drain terminal of the n-type MOS transistor 20 is connected to the wire harness 6, and the source terminal of the n-type MOS transistor 20 is connected to the ground (GND). That is, the n-type MOS transistor 20 whose on/off state is controlled according to the output of the comparator 19 is connected in parallel to the horn SW 4.

With this configuration, in the disconnection determination circuit 14 of Embodiment 1, the on/off state of the contact circuit 3 of the relay 1 is controlled based on comparison of the voltage of the wire harness 16 for disconnection detection on the disconnection detection unit 12 side and the reference voltage Vref independently from the horn SW 4. As a result, drive power from the battery can be supplied from the contact circuit 3 of the relay 1 to the two horns 10 and 11 through the wire harnesses 9, 9a, and 9b and the like.

The wire harness 16 for disconnection detection has one end electrically connected to the cathode of the diode 18 (the output of the current circuit 13), that is, the output of the disconnection detection unit 12. The other end of the wire harness 16 for disconnection detection is electrically connected to the end portion on the horn 11 side of the wire harness 9b supplying power to the horn 11, that is, the upstream side of the load circuit. At this time, the wire harness 16 for disconnection detection on the disconnection detection unit 12 side is disposed at the tip of a region A indicated by a dotted line in the drawing, that is, along the wire harness 9 on the horns 10 and 11 side. In particular, in the wire harness 16 for disconnection detection of Embodiment 1, first, the wire harness 16 for disconnection detection is disposed to the horn 10 along the wire harness 9a at the branch position B of the wire harness 9. The wire harness 16 for disconnection detection is folded at the horn 10 without being electrically connected to the wire harness 9a or the horn 10, is again disposed to the branch position B along the wire harness 9a, and is then disposed to the horn 11 along the wire harness 9b, and the end portion of the wire harness 16 for disconnection detection is electrically connected to the end portion of the wire harness 9b on the horn 11 side. The invention is not limited to a configuration in which the wire harness 16 for disconnection detection is connected to the horn 11 side of the two horns 10 and 11. For example, the wire harness 16 for disconnection detection may be disposed to be folded on the horn 11 side, and the wire harness 16 for disconnection detection may be electrically connected to the wire harness 9a on the horn 10 side. The wire harness 16 for disconnection detection may be disposed to be folded on one horn side of the two horns 10 and 11, and the wire harness 16 for disconnection detection may be electrically connected directly to the ground (GND) on the other horn side. In this configuration, as in Embodiment 3 described below, it is possible to extend the setting range of the reference voltage Vref.

Since a small current is supplied to the wire harness 16 for disconnection detection of Embodiment 1, the wire harness 16 for disconnection detection may be formed using an electric cable having a small outer diameter (cable diameter). In this case, like a portion disposed along the wire harness 9a, even in a case where the wire harness 16 for disconnection detection having two portions, one portion directed toward the horn 10 and the other portion folded at the horn 10 and directed toward the horn 11, are disposed along one wire harness 9a, the entire wire harness can have flexibility. As a result, even in a case where the wire harness 16 for disconnection detection having the two portions (reciprocating portions) is disposed along the wire harness 9a, it is possible to minimize an increase in burden required for the arrangement.

In addition, as a configuration in which the wire harness 16 for disconnection detection is disposed along the wire harnesses 9, 9a, and 9b, for example, it is preferable that the wire harness 16 for disconnection detection is wound by a tape along with the wire harnesses 9, 9a, and 9b assumed to be cut by the thief, that is, subjected to disconnection detection, that is, the wire harnesses apparently become one wire harness. More preferably, an electric cable in which a conductor to be the wire harnesses 9, 9a, and 9b subjected to disconnection detection and a conductor to be the wire harness 16 for disconnection detection are disposed in the same insulating coating may be used.

Next, the reference voltage Vref output from the reference power supply 15 will be described. AS will be apparent from FIG. 1, since the wire harness 16 for disconnection detection is disposed along the wire harnesses 9, 9a, and 9b connected to the two horns 10 and 11, the constant current Iset output from the current circuit 13 flows through the wire harness 16 for disconnection detection in a direction of arrow in the drawing. In particular, in the configuration of Embodiment 1, the resistor 17 and the diode 18 forming the current circuit 13 is connected to one end of the wire harness 16 for disconnection detection, and the horn 11 is connected to the other end of the wire harness 16 for disconnection detection.

In a normal state, that is, in a case where the wire harness 16 for disconnection detection and the wire harnesses 9, 9a, and 9b are not cut, and in a case where the horn SW 4 is turned off and the n-type MOS transistor 20 of the disconnection determination circuit 14 is turned off, the contact circuit 3 of the relay (horn relay) 1 is turned off. In addition, in the configuration of Embodiment 1, the wire harness 9b is connected to the wire harness 9a; thus, when viewed from the other end (the end portion on the horn 11 side) of the wire harness 16 for disconnection detection, the two horns 10 and 11 have a relationship of parallel connection.

Accordingly, in regard to an input voltage V1 to the disconnection determination circuit 14 in the normal state, in a case where the internal resistance of the horn 10 is Rhigh and the internal resistance of the horn 11 is Rlow, the normal voltage V1 becomes V1=Iset×Rhigh×Rlow/(Rhigh+Rlow). In a case where the voltage of the power supply, that is, the battery voltage is VB and the resistance value of the resistor 17 is Rpullup, a voltage drop due to the forward voltage of the diode 18 and a voltage drop caused by the wiring resistance of the wire harness 16 for disconnection detection become a significantly small voltage, and are thus negligible. Thus, Iset=VB/(Rpullup+(Rhigh×Rlow/(Rhigh+

Rlow)) is established. Therefore, V1=VB/(Rpullup+(Rhigh×Rlow/(Rhigh+Rlow))×Rhigh×Rlow/(Rhigh+Rlow) is established.

In a case where one position of the positions indicated by the marks x, that is, one wire harness of the wire harnesses 9a and 9b is cut, in the configuration of the invention, since the wire harness 16 for disconnection detection is disposed along the wire harnesses 9a and 9b, the wire harness 16 for disconnection detection is disconnected together. As a result, in a case where the input voltage to the disconnection determination circuit 14 at the time of disconnection is V2, since the voltage VB becomes the voltage VB of the power supply supplied from the power supply through the resistor 17, V2=VB is established.

Thus, the voltage (reference voltage) Vref output from the reference power supply 15 is a voltage between the voltage V2 and the voltage V1, that is, satisfies V2>Vref>V1, whereby it is possible to detect disconnection of the wire harnesses 9a and 9b through the wire harness 16 for disconnection detection.

Accordingly, in the disconnection detection unit 12 of Embodiment 1, the voltage between the voltage V1 and the voltage V2 is set as the reference voltage Vref. With this configuration, it is possible to simplify the circuit configuration of the current circuit 13, and even if the wire harnesses 9a and 9b connected to the horns 10 and 11 having comparatively low internal resistance are cut, it is possible to reliably and easily detect disconnection (cut).

Figure 2:
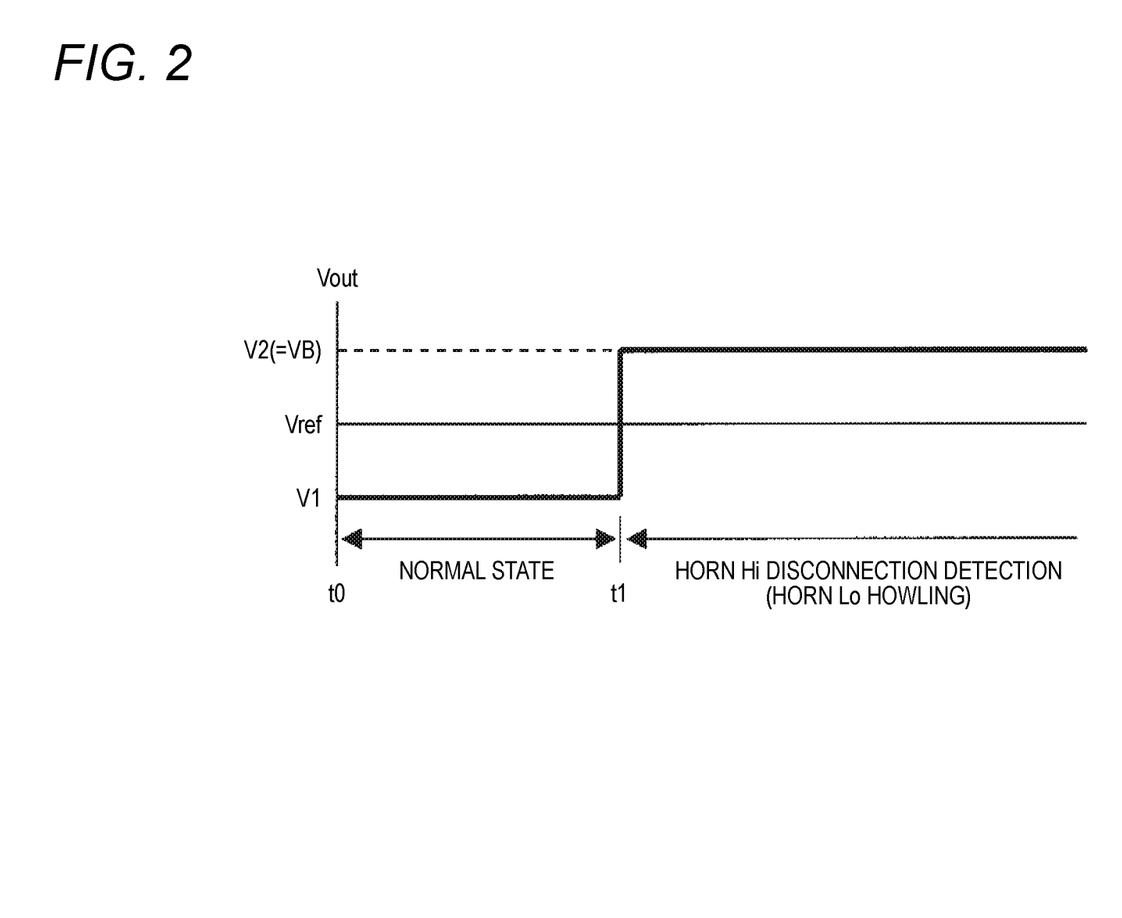
FIG. 2 is a diagram illustrating a disconnection detection operation in a horn control device in Embodiment 1 of the invention.

Next, FIG. 2 is a diagram illustrating a disconnection detection operation in a horn control device of Embodiment 1 of the invention, and hereinafter, the disconnection detection operation in the disconnection detection unit 12 shown in FIG. 1 and the operation of the horn device will be described referring to FIG. 2. FIG. 2 is a diagram showing a voltage Vout in a case where the wire harness 9a is cut at the position of the mark x superimposed on the wire harness 9a of the two marks x shown in FIG. 1 at the time t1. Even in a case where the wire harness 9b is cut at the position of the mark x superimposed on the wire harness 9b of the two marks x shown in FIG. 1, the same detection operation as in a case where the wire harness 9a is cut is performed, and thus, detailed description thereof will not be repeated.

In a period (time t0 to time t1) during which any of the wire harnesses 9a and 9b (including the wire harness 16 for disconnection detection) shown in FIG. 2 is not cut, the contact circuit 3 of the relay 1 is turned off. Accordingly, the constant current Iset supplied from the current circuit 13 to the input terminal of the horn 11 through the wire harness 16 for disconnection detection flows to the ground (GND) through the horn 11 and the horn 10 electrically connected to the horn 11 through the wire harness 9b. Thus, the voltage Vout between the resistor 17 and the diode 18 constituting the current circuit 13 becomes V1, and the voltage input to the non-inverting input terminal of the comparator 19 becomes V1. Therefore, the n-type MOS transistor 20 is maintained in the off state. As a result, the contact circuit 3 of the relay 1 is also maintained in the off state, and the output voltage of the current circuit 13, that is, the voltage in the wire harness 16 for disconnection detection becomes the voltage V1.

At the time t1 shown in FIG. 2, in a case where the wire harness 9a connected to the high-tone horn 10 is disconnected (cut), in this configuration, since the wire harness 16 for disconnection detection is disposed along the wire harness 9a, the wire harness 16 for disconnection detection is also disconnected (cut). In the configuration of Embodiment 1, since the wire harness 16 for disconnection detection before folded and after folded is arranged along the wire harness 9a, both sides or one side of the wire harness 16 for disconnection detection before folded and after folded may be disconnected (cut).

As a result, since a current path in which the current Iset flows is shut off, the voltage Vout between the resistor 17 and the diode 18 of the current circuit 13 becomes V2, the voltage V2 higher than the reference voltage Vref input to the inverting input terminal of the comparator 19 is input to the non-inverting input terminal, and the input of the voltage V2 is maintained. When the voltage V2 is input, the output of the comparator 19 is at high level (the power supply voltage of the comparator 19) and the n-type MOS transistor 20 is placed in the on state; thus, the current flows in the coil 2 of the relay 1, the contact circuit 3 is turned on, and the on state of the contact circuit 3 is maintained. When the relay 1 is turned on, drive power is supplied to the low-tone horn 11 through the uncut wire harnesses 9 and 9b, and horn sound of the horn 11 is output. In a case where the wire harness 9b is cut, when the relay 1 is turned on, drive power is supplied to the high-tone horn 10 through the uncut wire harnesses 9 and 9a, and horn sound of the horn 10 is output. Control means (not shown) for controlling the output of the n-type MOS transistor 20 may be provided, the output of the n-type MOS transistor 20 may be controlled by the control means, and horn sound may be discontinuously output.

As described above, in the horn device of Embodiment 1, the wire harness 16 for disconnection detection is disposed along the wire harnesses 9, 9a, and 9b from a region A (a region largely separated from the horns 10 and 11) closer to the relay 1 than the branch position into the wire harnesses 9a and 9b through which drive power is supplied to the two horns 10 and 11, the current Iset is supplied from the current circuit 13 to the wire harness 16 for disconnection detection, and the disconnection determination circuit 14 monitors the output voltage of the current circuit 13 to monitor disconnection of a current path from the wire harness 16 for disconnection detection to the ground (GND) through the horns 10 and 11 and to monitor disconnection (cut) of the wire harnesses 9, 9a, and 9b disposed along the wire harness 16 for disconnection detection. In addition, in a case where the disconnection determination circuit 14 detects disconnection of the current path, the disconnection determination circuit 14 controls the switch (relay) of the horn device to supply a drive current for driving the horns 10 and 11 through the wire harnesses 9, 9a, and 9b. Therefore, it is possible to drive one horn of the two horns 10 and 11 through the wire harnesses in which disconnection (cut) does not occur. That is, even in a case where the wire harnesses 9a and 9b of the horn device are cut and the horn device is invalidated, horn sound of one horn can be output as alarm sound. As a result, it is possible to issue a warning to the thief and to make surrounding people be informed (recognize); thus, it is possible to improve antitheft performance of the horn device including the disconnection detection device of the invention and an antitheft device in which the horn device is used as an alarm device of the antitheft device.

In particular, in the horn device including the disconnection detection device of Embodiment 1, alarm sound is generated independently from a conventional antitheft device; thus, in a vehicle in which an antitheft device is mounted, a dual security system (crime prevention system) is formed, whereby it is possible to further improve antitheft performance. In addition, the disconnection detection unit 12 has a simple configuration, and thus, can be manufactured at low cost and reduced in size. Therefore, it is possible to obtain a remarkable effect capable of easily later mounting (attaching) the disconnection detection device in an existing horn device of a conventional system.

In the disconnection detection device of Embodiment 1, although the on/off state of the relay 1 is controlled by the n-type MOS transistor 20 disposed in parallel to the horn SW 4, and drive power is supplied to the two horns 10 and 11, the invention is not limited thereto. For example, like a case where power consumption of the horns 10 and 11 is small, or the like, in a case where a load at the time of on/off of the horn SW 4 is small, the horn SW 4 may be disposed in a portion of the contact circuit 3 of the relay 1 without using the relay 1. In this case, in order to output horn sound at the time of disconnection detection, power can be supplied from the disconnection determination circuit 14 to the horns 10 and 11.

Even in a case where a siren for alarm or a lamp for alarm which only performs alarm output from an antitheft device is provided independently from the horn device including the disconnection detection device of Embodiment 1, in a case where the siren or lamp for alarm is formed of two horns, the invention can be applied. In addition, even in a case where there is only one siren for alarm or one lamp for alarm, the disconnection determination circuit 14 can drive the siren for alarm or the lamp for alarm to control the on/off state of the siren for alarm or the lamp for alarm, whereby it is possible to output alarm sound from the siren for alarm at the time of disconnection detection of the wire harness of the horn device or to turn on the lamp for alarm.

The disconnection detection device of Embodiment 1 can be incorporated in a conventional horn device. In this case, for example, a configuration in which the wire harness 16 for disconnection detection is disposed along the wire harness electrically connecting the relay (horn relay) 1 and the horns 10 and 11, the output from the current circuit 13 is supplied to the wire harness 16 for disconnection detection, and the output of the n-type MOS transistor 20 is connected to a signal line (wire harness) turning on/off the relay 1, or the like is made.

In addition, in the disconnection detection device of Embodiment 1, although disconnection of the two branched wire harnesses 9a and 9b is detected using one wire harness 16 for disconnection detection, the invention is not limited thereto. For example, the current circuit 13, the disconnection determination circuit 14, and the wire harness 16 for disconnection detection may be prepared for two circuits, one wire harness 16 for disconnection detection may be disposed along the wire harness 9a, and the other wire harness 16 for disconnection detection may be disposed along the wire harness 9b. With this configuration, one wire harness 16 for disconnection detection can be disposed along each of the wire harnesses 9a and 9b after branched.

Although a method which causes the current Iset for detection to directly flow to a load circuit, such as the horns 10 and 11, is also considered, in a case where two or more low-resistance loads, such as the horns 10 and 11, are connected in parallel to the two wire harnesses 9a and 9a, it is known that voltage fluctuation at the time of disconnection of the wire harnesses 9a and 9b is made small. In order to make the voltage fluctuation large, a method which causes a large amount of current Iset to flow is known; however, in this case, power consumption of the disconnection detection device becomes large. In contrast, in the disconnection detection device of Embodiment 1, since fluctuation of the detected voltage caused by disconnection (cut) of the wire harness 16 for disconnection detection can be increased, it is possible to perform disconnection detection with improved noise resistance or the like with a simple configuration.

In the configuration of Embodiment 1, the dedicated wire harness 16 for disconnection detection is used for disconnection (cut) detection. Therefore, even in a case where the disconnection detection device is applied to the horn device or other devices, there is no need for the adjustment or the like of the reference voltage Vref for the respective internal resistance of an actuator, such as a motor as a load; therefore, it is also possible to obtain an effect to easily apply the invention to other devices (other loads) or vehicle models.

In the configuration of the disconnection detection device of Embodiment 1 of the invention, it is possible to easily and reliably detect disconnection (cut) of the wire harness connected to the low-resistance load only by adding the wire harness 16 for disconnection detection. Therefore, it is possible to improve disconnection detection performance at low cost compared to a case where disconnection detection performance is improved by devising the configuration of the disconnection determination circuit 14 or the current circuit 13.

Embodiment 2

Figure 3:
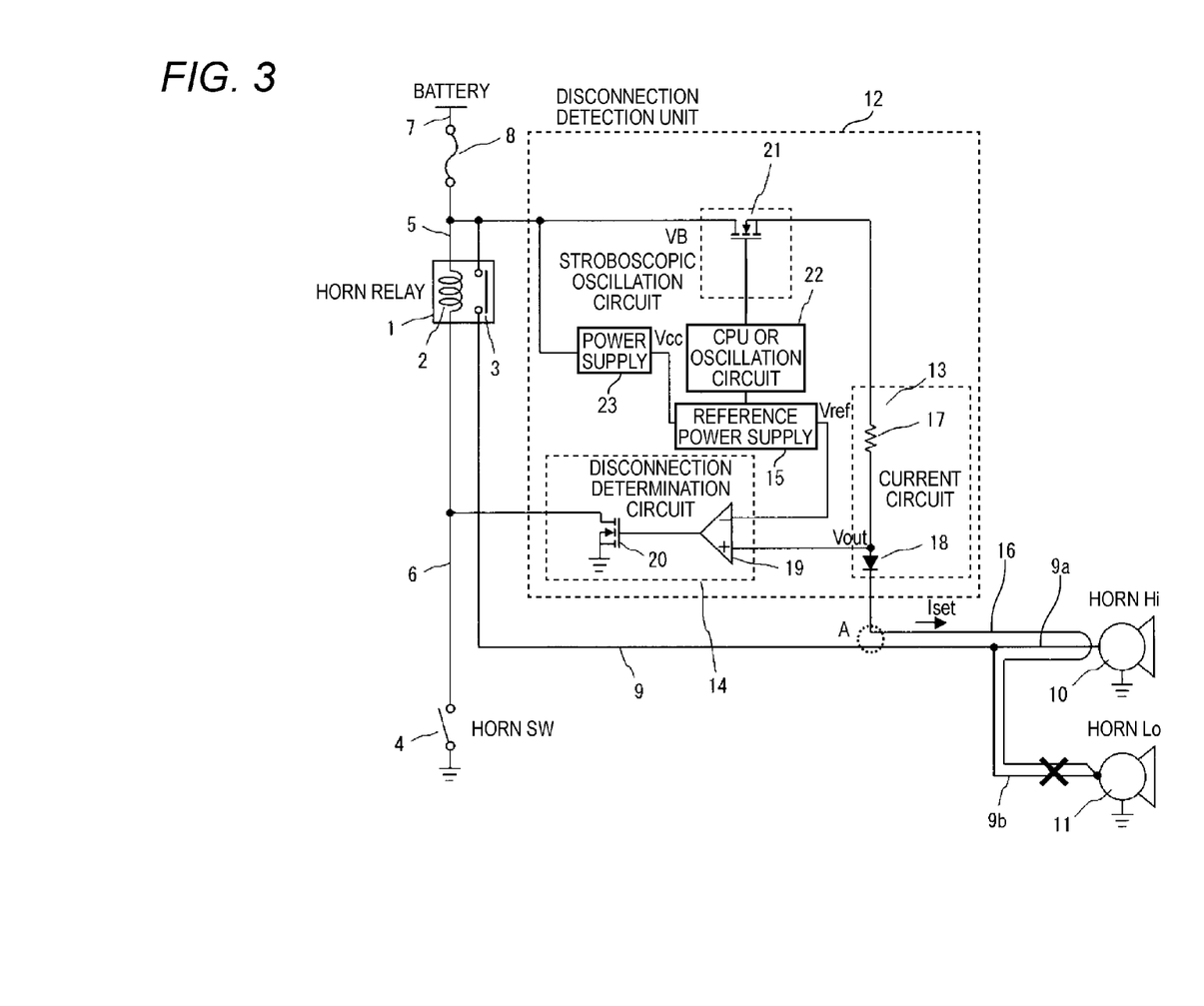
FIG. 3 is a diagram illustrating the schematic configuration of a horn device including a disconnection detection device of Embodiment 2 of the invention.
Figure 4:
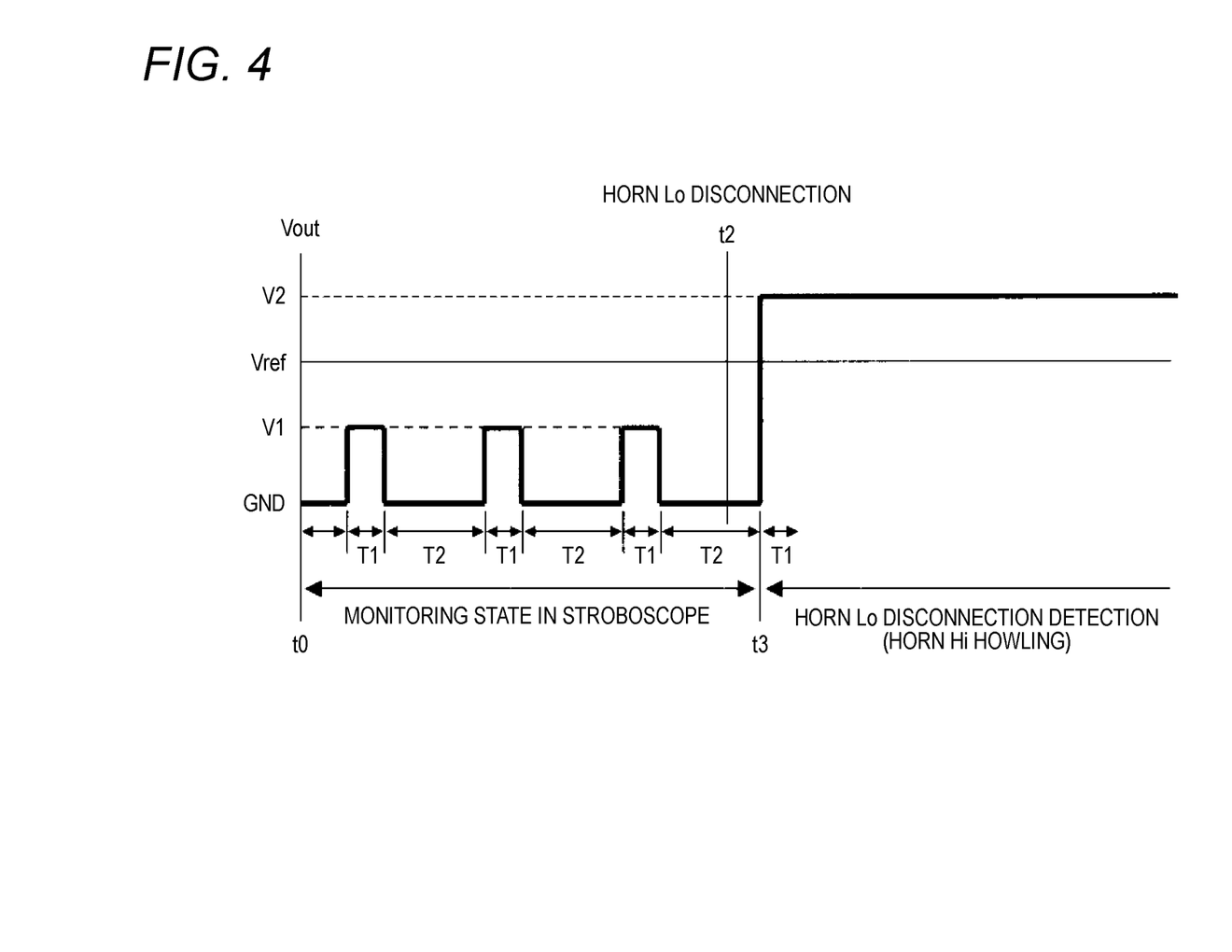
FIG. 4 is a diagram illustrating a disconnection detection principle in the disconnection detection device of Embodiment 2.

FIG. 3 is a diagram illustrating the schematic configuration of a horn device including a disconnection detection device of Embodiment 2 of the invention, and FIG. 4 is a diagram illustrating a disconnection detection principle in the disconnection detection device of Embodiment 2. Hereinafter, the horn device including the disconnection detection device of Embodiment 2 will be described referring to FIGS. 3 and 4. A disconnection detection unit 12 of Embodiment 2 has the same configuration as that of the disconnection detection unit 12 of Embodiment 1 excluding a stroboscopic oscillation circuit 21, an oscillation circuit 22, and a power supply circuit 23. Therefore, in the following description, the stroboscopic oscillation circuit 21, the oscillation circuit 22, and the power supply circuit 23 will be described in detail.

As will be apparent from FIG. 3, the disconnection detection unit 12 of Embodiment 2 includes, in addition to the configuration of Embodiment 1, a stroboscopic oscillation circuit 21 which is disposed between the current circuit 13 and the power supply, an oscillation circuit 22 which supplies a signal to be a reference to the stroboscopic oscillation circuit 21, and a known power supply circuit 23 which supplies drive power of a power supply voltage Vcc to the reference power supply 15 or the oscillation circuit 22.

The oscillation circuit 22 outputs a clock signal having a desired cycle using a known oscillation circuit which generates and outputs a clock signal to be a reference, or a known CPU. In the disconnection detection unit 12 of Embodiment 2, in a case where the oscillation circuit 22 is formed using a known CPU, a configuration in which the on/off state of the relay 1 caused by the on/off state of the horn SW 4 is monitored using the CPU, and the output of the n-type MOS transistor 20 is controlled based on the result of monitoring may be made.

The stroboscopic oscillation circuit (supply control circuit) 21 includes a known MOS transistor, and the power supply and the current circuit 13 are electrically connected to each other through the MOS transistor. The stroboscopic oscillation circuit 21 controls the voltage of the gate terminal of the MOS transistor, for example, in each cycle of a period T1 and a period T2 shown in FIG. 4 based on the clock signal and the like supplied from the oscillation circuit 22. The supply of power from the power supply to the current circuit 13 is limited by the control of the voltage supplied to the gate terminal. In particular, in the stroboscopic oscillation circuit 21 of Embodiment 2, as shown in FIG. 4, after disconnection (cut) of the wire harness 16 for disconnection detection (including the wire harnesses 9, 9a, and 9b) is detected, the MOS transistor is maintained in the on state. After disconnection of the wire harness 16 for disconnection detection (including the wire harnesses 9, 9a, and 9b) is detected, the MOS transistor may not be maintained in the on state. In this case, the output and stop of horn sound can be repeated in synchronization with the period T1 and the period T2. A disconnection detection result may be stored in the disconnection determination circuit. The supply of power from the power supply to the current circuit 13 will be described below in detail.

In addition, in the disconnection detection unit 12 of Embodiment 2, the reference power supply 15 generates the reference voltage Vref based on the power supply voltage Vcc supplied from the power supply circuit 23 and supplies the reference voltage Vref to the inverting input terminal of the comparator 19. However, as in Embodiment 1, the reference voltage Vref may be generated from power supplied from the power supply.

Next, a disconnection detection operation in the horn device including the disconnection detection device of Embodiment 2 will be described referring to FIG. 4. However, the disconnection detection operation in a case where one of the wire harnesses 9a and 9b (including the wire harness 16 for disconnection detection) is cut is the same as in Embodiment 1 described above. Accordingly, in the following description, only a disconnection detection operation in a case where the wire harness 9b (including the wire harness 16 for disconnection detection) indicated by the mark x in FIG. 3 is cut will be described.

As will be apparent from FIG. 3, in the disconnection detection unit 12 of Embodiment 2, power from the power supply is supplied to the current circuit 13 through the MOS transistor provided in the stroboscopic oscillation circuit 21. That is, only in a period during which the MOS transistor of the stroboscopic oscillation circuit 21 is turned on, the constant current Iset is supplied from the current circuit 13. Thus, in a case where disconnection does not occur in the wire harness 16 for disconnection detection (including the wire harnesses 9, 9a, and 9b), the current Iset discontinuously output from the current circuit 13 is supplied to the input terminal of the horn 11 through the wire harness 16 for disconnection detection. As in Embodiment 1, the current Iset supplied to the input terminal of the horn 11 flows to the ground (GND) through the horn 11 and the horn 10 electrically connected to the horn 11 through the wire harness 9b.

Accordingly, in the period T1 (the period T1 shown in FIG. 4) during which the constant current Iset is supplied, as in Embodiment 1, the voltage Vout between the resistor 17 and the diode 18 constituting the current circuit 13 becomes V1, and the voltage input to the non-inverting input terminal of the comparator 19 also becomes V1. In the period T2 (the period T2 shown in FIG. 4) during which the constant current Iset is not supplied, that is, in the period T2 when the MOS transistor of the stroboscopic oscillation circuit 21 is turned off, the voltage Vout of the wire harness 16 for disconnection detection becomes a ground potential (GND potential). The period T1 during which the current Iset is supplied and the period T2 during which the current Iset is not supplied are alternately repeated, whereby it is possible to make the period T1 for supplying the current Iset for detecting disconnection of the wire harness 16 for disconnection detection short and to reduce power consumption in the disconnection detection device of Embodiment 2.

In particular, in the configuration of Embodiment 2, since the period T2 during which the current Iset is not supplied is greater than the period T1 during which the current Iset is supplied, it is possible to significantly reduce power consumption in the disconnection detection device of Embodiment 2. In this case, in a vehicle in which an engine is used as a power source, the capacity of the battery is much smaller than that in an electric vehicle or the like; thus, it is possible to obtain an effect to significantly reduce power consumption (so-called dark current) when the engine is stopped.

In a case where the position indicated by the mark x in FIG. 3, that is, the wire harness 16 for disconnection detection is disconnected (cut) along with the wire harness 9b connected to the low-tone horn 11 and this disconnection (cut) occurs at the time t2 within the period T2 during which the current Iset is not supplied, as shown in FIG. 4, at the time t2, the voltage Vout between the resistor 17 and the diode 18 of the current circuit 13 supplying the current Iset to the wire harness 16 for disconnection detection is not changed. For this reason, at the time t2, disconnection of the wire harness 16 for disconnection detection (including the wire harness 9b) is not detected. However, at the time t3 when the next period T1 starts, the current Iset is supplied, and since the wire harness 16 for disconnection detection is disconnected, at the time t3 when the period T1 of FIG. 4 starts, the voltage at the voltage Vout between the resistor 17 and the diode 18 becomes the voltage V2 (=VB).

In the disconnection detection unit 12 of Embodiment 2, the reference voltage Vref also becomes the voltage between the voltage V1 and the voltage V2. Accordingly, the output of the comparator 19 of the disconnection determination circuit 14 of the disconnection detection unit 12 of Embodiment 2 has a high voltage, and the n-type MOS transistor 20 is turned on. As a result, the relay 1 is turned on, drive power is supplied from the power supply to the high-tone horn 10 through the contact circuit 3 and the wire harnesses 9 and 9a, and horn sound is output from the horn 10.

Accordingly, in the horn device including the disconnection detection device of Embodiment 2, it is possible to obtain the same effects as in Embodiment 1, and since the current is output discontinuously (intermittently), it is possible to obtain a remarkable effect to significantly reduce power consumption in the disconnection detection device.

In the disconnection detection device of Embodiment 2, from the occurrence of disconnection (cut) of the wire harness 16 for disconnection detection to the disconnection detection, the period T2 is required in the longest case. However, the period (cycle) from the start of the period T1 to the start of the next period T1, that is, each of the period T1 and the period T2 is appropriately set to be short in consideration of parasitic capacitance or the like generated in the contact circuit 3 of the relay 1 and the wire harness 16 for disconnection detection, whereby it is possible to reduce the time from the occurrence of disconnection (cut) to the disconnection detection.

In the disconnection detection unit 12 of Embodiment 2, although the power supply circuit 23 and the reference power supply 15 are provided separately from each other, the invention is not limited thereto, and the power supply circuit 23 and the reference power supply 15 may be formed integrally.

Embodiment 3

Figure 5:
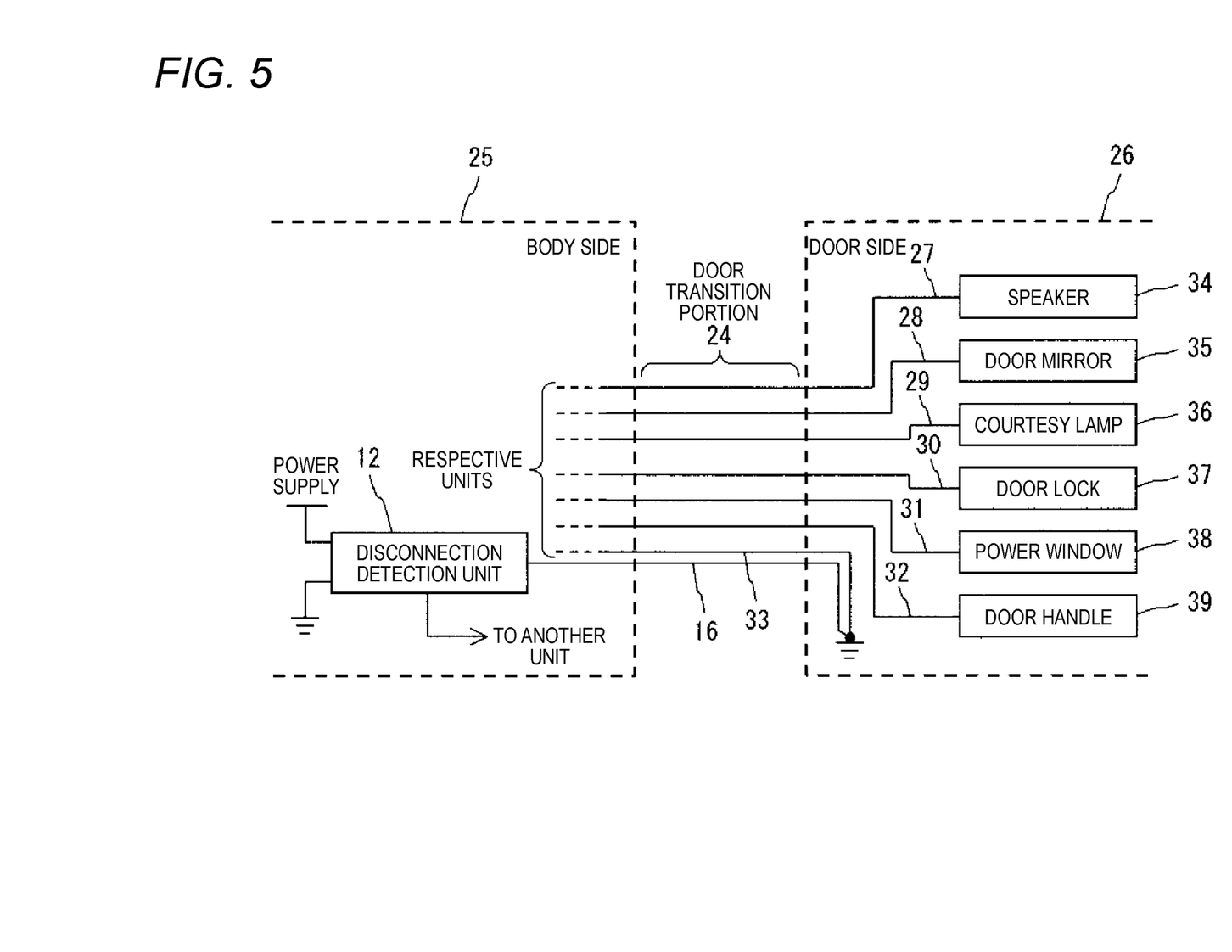
FIG. 5 is a diagram illustrating the schematic configuration of a disconnection detection device of Embodiment 3 of the invention.
Figure 6:
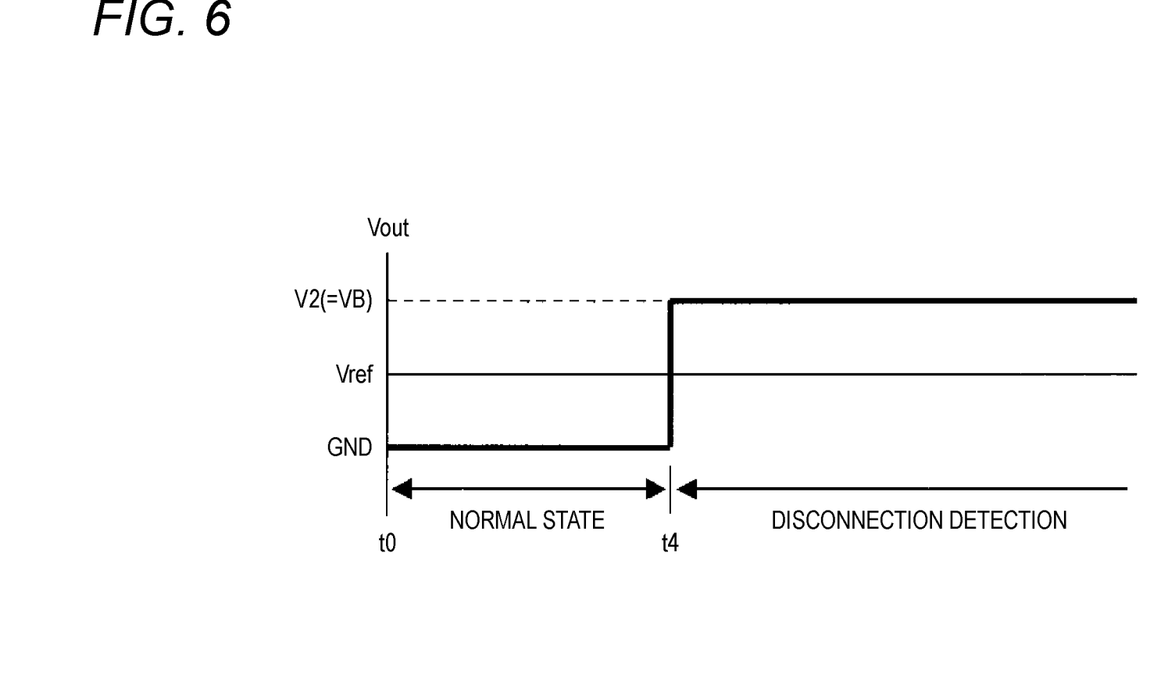
FIG. 6 is a diagram illustrating a disconnection detection principle in the disconnection detection device of Embodiment 3.

FIG. 5 is a diagram illustrating the schematic configuration of a disconnection detection device of Embodiment 3 of the invention, and FIG. 6 is a diagram illustrating a disconnection detection principle in the disconnection detection device of Embodiment 3. In particular, FIG. 5 is a diagram showing a configuration in a case where the disconnection detection device of the invention is applied to disconnection (cut) of a wire harness arranged in a door transition portion of a vehicle. Hereinafter, a detection operation of the disconnection detection device of Embodiment 3 when disconnection (cut) of wire harnesses 27 to 33 arranged in a door transition portion 24 is detected will be described referring to FIGS. 5 and 6. The disconnection detection unit 12 of Embodiment 3 has the same configuration as that of the disconnection detection unit 12 of Embodiment 1, and thus, in the following description, the wire harnesses 27 to 33 and the wire harness 16 for disconnection detection arranged in the door transition portion 24 will be described. As the disconnection detection unit 12 of Embodiment 3, the disconnection detection unit 12 of Embodiment 2 can be applied.

As will be apparent from FIG. 3, in the configuration of Embodiment 3, the disconnection detection unit 12 is disposed on a body side 25 of a vehicle, and in particular, in Embodiment 3, an output (an output of a disconnection determination circuit (not shown)) in a case where the disconnection detection unit 12 detects disconnection is directed to other units, such as a known antitheft device. As in Embodiments 1 and 2 described above, a relay may be controlled directly by the disconnection detection output of the disconnection detection unit 12, and a horn device or/and a security horn may be controlled to sound.

In the configuration of Embodiment 3, on a door side 26 of the vehicle, a speaker 34, an actuator (door mirror motor) (not shown) of a door mirror 35, a courtesy lamp 36, an actuator (door lock motor) (not shown) of a door lock 37, an actuator (power window motor) (not shown) of a power window 38, a sensor (not shown) of a door handle 39, and the like are disposed. The actuators (motors), the sensor, the courtesy lamp 36, and the like are respectively electrically connected to known switches or a control unit disposed on the body side 25 of the vehicle by the wire harnesses 27 to 32.

At this time, the speaker 34 is connected to the wire harness 27, the door mirror 35 is connected to the wire harness 28, the courtesy lamp 36 is connected to the wire harness 29, the door lock 37 is connected to the wire harness 30, the power window 38 is connected to the wire harness 31, and the door handle 39 is connected to the wire harness 32. In addition, in the configuration of Embodiment 3, the wire harness 33 to be a ground line (GND line) is arranged in the door transition portion 24 along with the wire harnesses 27 to 32.

In the disconnection detection device of Embodiment 3, the wire harness 16 for disconnection detection is arranged along the wire harnesses 27 to 33, and the end portion of the wire harness 16 for disconnection detection on the door side 26 is electrically connected to the end portion of the wire harness 33 on the door side 26. In particular, the wire harness 33 becomes a wire harness which is connected in common to electrical components disposed on the door side 26. Accordingly, in the configuration of Embodiment 3, the end portion of the wire harness 16 for disconnection detection on the door side 26 is electrically connected to the end portion of the wire harness 33 on the door side 26, and the wire harness 16 for disconnection detection is disposed in the vicinity of the wire harness 33. However, the wire harness 16 for disconnection detection and the wire harness 33 may be wound by a tape such that the wire harness 16 for disconnection detection is integrated with the wire harness 33. With this configuration, as in Embodiments 1 and 2, the wire harness 33 is disconnected (cut), and the wire harness 16 for disconnection detection is also disconnected (cut).

In the disconnection detection device of Embodiment 3 configured as above, in a case where the wire harnesses 27 to 33 (including the wire harness 16 for disconnection detection) are not disconnected, the voltage in the wire harness 16 for disconnection detection becomes GND, that is, 0 (zero) V. Thus, GND is also input to the disconnection determination circuit (not shown) provided in the disconnection detection unit 12.

In a case where the wire harness 16 for disconnection detection is disconnected (cut) along with at least the wire harness 33 (including a case where the wire harness 16 for disconnection detection is disconnected (cut) along with all wire harnesses 27 to 33), as in Embodiment 1 described above, the wire harness 16 for disconnection detection is placed in a high impedance state. Thus, the power supply voltage (for example, the voltage VB) is input to the disconnection determination circuit (not shown) provided in the disconnection detection unit 12. Accordingly, in the disconnection determination circuit (not shown) provided in the disconnection detection unit 12 of Embodiment 3, a voltage between GND which is the voltage in a case where the wire harness 16 for disconnection detection is not disconnected (cut) and the voltage VB of the power supply which is the voltage in a case where the wire harness 16 for disconnection detection is disconnected (cut) is set as the reference voltage Vref, and the determination of presence or absence of disconnection is performed. At this time, in the configuration of Embodiment 3, the voltage between the voltage VB of the power supply and GND can be used as the reference voltage Vref, that is, the reference voltage Vref can be set within a wide voltage range compared to Embodiments 1 and 2; therefore, it is possible to obtain a remarkable effect capable of improving resistance to noise in the disconnection determination circuit.

Next, the disconnection detection operation of the disconnection detection device of Embodiment 3 will be described referring to FIG. 6.

In a period (time t0 to time t4) during which any of the wire harnesses 27 to 33 (including the wire harness 16 for disconnection detection) shown in FIG. 5 is not disconnected, the end portion of the wire harness 16 for disconnection detection on the door side 26 is connected to GND. Thus, the voltage which is input to the non-inverting input terminal of the comparator of the disconnection determination circuit provided in the disconnection detection unit 12 becomes GND, and the output of the disconnection determination circuit is maintained in the off state.

At the time t4 shown in FIG. 6, in a case where the wire harnesses 27 to 33 are disconnected (cut), since wire harness 16 for disconnection detection is disposed along the wire harnesses 27 to 33, the wire harness 16 for disconnection detection is also disconnected (cut). As a result, a current path to the ground (GND) through the wire harness 16 for disconnection detection is shut off; thus, the voltage which is input to the non-inverting input terminal of the comparator of the disconnection determination circuit becomes the voltage VB of the power supply, and the output of the disconnection determination circuit is turned on. As a result, disconnection is notified from the disconnection detection unit 12 to the antitheft device or the like, and alarm sound is output from the security horn or the like provided in the antitheft device.

As described above, in the disconnection detection device of Embodiment 3, the wire harness 16 for disconnection detection is arranged along with the wire harnesses 27 to 33 arranged between the body side 25 and the door side 26 of the vehicle to monitor disconnection; thus, it is possible to prevent the thief from cutting the wire harnesses 27 to 33 in the door transition portion 24 and supplying drive power to the door motor of the door lock 37 from the cut door-side wire harness 30 to unlock the door, and to improve antitheft performance.

The disconnection detection device of the invention is not limited to the detection of disconnection (cut) of the wire harness of the horn device, and can be easily applied to the detection of disconnection (cut) of other wire harnesses with a simple configuration. In addition, it is possible to add a disconnection (cut) detection function of a wire harness with a simple configuration; therefore, it is possible to obtain the same effects as in Embodiments 1 and 2 described above, and to improve antitheft performance of a vehicle at low cost.

The characteristics of the disconnection detection device according to the embodiments of the invention described above will be briefly summarized and listed in the following items [1] to [7].

[1] A disconnection detection device for an in-vehicle device having a load circuit (horns 10 and 11), a load drive circuit (relay 1) which controls supply of drive power for driving the load circuit, and a first wire harness (9a and 9b) which has one end connected to the load drive circuit and the other end connected to the load circuit and supplies the drive power from the load drive circuit to the load circuit, wherein the disconnection detection device detects disconnection of the first wire harness, the disconnection detection device comprising:

a second wire harness (16) which is arranged along at least a part of the first wire harness;

a current circuit (13) which supplies a current for disconnection detection to the second wire harness; and a disconnection determination circuit (14) which monitors an output voltage of the current circuit so as to determine presence or absence of disconnection of the second wire harness, and wherein disconnection of the second wire harness is detected as the disconnection of the first wire harness based on disconnection determination of the disconnection determination circuit.

[2] The disconnection detection device described in [1], wherein the load circuit includes at least two horns (10 and 11) which output horn sound, wherein the load drive circuit includes a drive switch which supplies the drive power to the two horns, wherein the disconnection determination circuit monitors the output voltage of the current circuit so as to determine the presence or absence of disconnection of the second wire harness, and turns on the drive switch so as to allow the drive power to be supplied to the first wire harness in a case where disconnection of the second wire harness is detected, and wherein the drive power is supplied to the horn connected to the first wire harness on a non-disconnection side of at least the two horns to output horn sound from the horn.

[3] The disconnection detection device described in [2], wherein the first wire harness is branched at a branch point and connected to each of the two horns, wherein the two horns are connected in parallel to the drive switch, and wherein the second wire harness is arranged along the first wire harness from the drive switch side farther than the branch, passes through the branch point, reaches one horn of the two horns, is folded without being connected to the one horn, is arranged to the branch point, and is arranged so as to reach the other horn of the two horns.

[4] The disconnection detection device described in [3], wherein the second wire harness includes one wire harness which has one end connected to the current circuit and the disconnection determination circuit, and the other end reaching the other horn through the one horn.

[5] The disconnection detection device described in [3] or [4], wherein the other end of the second wire harness is connected to the first wire harness at a connection position of the other horn and the first wire harness, or connected to the ground in the vicinity of the other horn, and wherein a reference voltage for the disconnection determination circuit to determine disconnection of the second wire harness is set to a voltage level between a power supply voltage of the current circuit and the voltage of the ground.

[6] The disconnection detection device described in any one of [2] to [5], wherein the drive switch includes a horn switch (4) and a relay (1), wherein the horn switch is turned on/off corresponding to an operation of a horn button, and wherein in the relay, one side of a contact circuit is connected to a power supply, the other side of the contact circuit is connected to the first wire harness, and the contact circuit is turned on/off corresponding to the on/off state of the horn switch.

[7] The disconnection detection device described in any one of [2] to [6], further includes a supply control circuit (stroboscopic oscillation circuit 21) which alternately performs the supply and stop of the current for disconnection detection supplied from the current circuit.

According to the embodiments, it is possible to improve disconnection detection performance of the wire harness transmitting drive power from the load drive circuit to the load circuit, and to improve antitheft performance. The invention achieving this advantage is useful for the disconnection detection device which detects the cut (disconnection) of the wire harness connected to the low-resistance load circuit, such as an actuator or a horn.

DESCRIPTION OF REFERENCE NUMERALS AND SIGNS

1: relay (horn relay)
2: coil
3: contact circuit
4: horn switch (horn SW)
5, 6, 7, 9, 9a, 9b, 27 to 33: wire harness
8: fuse
10, 11: horn
12: disconnection detection unit
13: current circuit
14: disconnection determination circuit
15: reference power supply
16: wire harness for disconnection detection
17: resistor
18: diode
19: comparator
20: n-type MOS transistor
21: stroboscopic oscillation circuit
22: oscillation circuit
23: power supply circuit
24: door transition portion
25: body side of vehicle
26: door side of vehicle 34: speaker
35: door mirror
36: courtesy lamp
37: door lock
38: power window
39: door handle

What is claimed is:

1. A disconnection detection device for an in-vehicle device having a load circuit, a load drive circuit which controls supply of drive power for driving the load circuit, and a first wire harness which has one end connected to the load drive circuit and the other end connected to the load circuit and supplies the drive power from the load drive circuit to the load circuit, wherein the disconnection detection device detects disconnection of the first wire harness, the disconnection detection device comprising:

a second wire harness which is arranged along at least a part of the first wire harness;

a current circuit which supplies a current for disconnection detection to the second wire harness; and a disconnection determination circuit which monitors an output voltage of the current circuit so as to determine presence or absence of disconnection of the second wire harness, wherein disconnection of the second wire harness is detected as the disconnection of the first wire harness based on disconnection determination of the disconnection determination circuit, wherein the load circuit includes at least two horns which output horn sound, wherein the load drive circuit includes a drive switch which supplies the drive power to the two horns, wherein the disconnection determination circuit monitors the output voltage of the current circuit so as to determine the presence or absence of disconnection of the second wire harness, and turns on the drive switch so as to allow the drive power to be supplied to the first wire harness in a case where disconnection of the second wire harness is detected, and wherein the drive power is supplied to the horn connected to the first wire harness on a non-disconnection side of at least the two horns to output horn sound from the horn.

2. The disconnection detection device according to claim 1, wherein the first wire harness is branched at a branch point and connected to each of the two horns, wherein the two horns are connected in parallel to the drive switch, and wherein the second wire harness is arranged along the first wire harness from the drive switch side farther than the branch, passes through the branch point, reaches one horn of the two horns, is folded without being connected to the one horn, is arranged to the branch point, and is arranged so as to reach the other horn of the two horns.

3. The disconnection detection device according to claim 2, wherein the second wire harness includes one wire harness which has one end connected to the current circuit and the disconnection determination circuit, and the other end reaching the other horn through the one horn.

4. The disconnection detection device according to claim 2, wherein the other end of the second wire harness is connected to the first wire harness at a connection position of the other horn and the first wire harness, or connected to the ground in the vicinity of the other horn, and wherein a reference voltage for the disconnection determination circuit to determine disconnection of the second wire harness is set to a voltage level between a power supply voltage of the current circuit and the voltage of the ground.

5. The disconnection detection device according to claim 1, wherein the drive switch includes a horn switch and a relay, wherein the horn switch is turned on/off corresponding to an operation of a horn button, and wherein in the relay, one side of a contact circuit is connected to a power supply, the other side of the contact circuit is connected to the first wire harness, and the contact circuit is turned on/off corresponding to the on/off state of the horn switch.

6. The disconnection detection device according to claim 1, further includes a supply control circuit which alternately performs the supply and stop of the current for disconnection detection supplied from the current circuit.

* * * * *